2,808,390

INTERPOLYESTERS FROM AROMATIC DIBASIC ACIDS AND OMEGA-HYDROXYALKYL ESTERS OF CARBONIC ACID

John R. Caldwell, Kingsport, Tenn., assignor to Eastman Kodak Company, Rochester, N. Y., a corporation of New Jersey No Drawing. Application July 26, 1954,
Serial No. 445,935

19 Claims. (Cl. 260—75)

This application relates to valuable linear polyesters prepared by condensing an aromatic dibasic acid diester and an omega-hydroxyalkyl diester of carbonic acid with a polymethylene glycol and possibly some minor amount of an aliphatic ether glycol or branched chain alkylene glycol.

It is an object of this invention to provide novel interpolyesters as described herein. It is another object to provide a process as described herein for preparing valuable interpolyesters. Other objects will become apparent hereinafter.

This application represents an extension of the concepts set forth in Caldwell copending application, Serial No. 313,062 filed October 3, 1952. That application discloses that sulfonyl dibenzoic acid can be condensed with various omega-hydroxyalkyl diesters of carbonic acid as well as certain other compounds.

Highly polymeric esters of terephthalic acid and various glycols, for example, ethylene glycol, trimethylene glycol, hexamethylene glycol, etc., are well known, and have been used in the preparation of linear, highly polymeric polyesters having properties including that of being capable of being formed into useful filaments, fibers and the like, and having high melting points and a low degree of solubility in organic solvents. Linear polyesters prepared from other aromatic dicarboxylic acids have also been described in the prior art and contemporary art. Moreover, interpolyesters of terephthalic acid and other dibasic acids condensed with dihydroxy compounds have also been described.

In most cases the known polyesters prepared from the aromatic dibasic acids such as terephthalic acid have sharp melting points. In contrast, the polyesters of this invention soften over a relatively wide temperature range and have exceptionally good flow characteristics, both of which make these polyesters especially valuable for the production of shaped objects by injection molding and extrusion methods. Moreover, these polyesters soften at about 150° C. or higher. Those softening above 200° C. are especially valuable. They can be advantageously employed for making many shaped objects, and can be used in some instances as a photographic film support or for textile fibers. Fibers which can be produced from the higher melting polyesters of this invention are strong, elastic, and have exceptional dyeability, probably because the carbonate radical produces non-crystalline areas in the polymer which are more readily penetrated by the dye. Furthermore, these polyesters are useful in making good electrical insulating materials.

According to my invention I have found that certain aromatic dibasic acid diesters plus an omega-hydroxyalkyl diester of carbonic acid can be condensed with a polymethylene glycol and possibly some aliphatic ether glycol or branched chain glycol to produce a new kind of linear interpolyester having highly valuable properties which are superior in certain respects to those of the linear polyesters described in the prior art.

My novel interpolyesters may contain as constituents thereof small percentages of the aliphatic ether glycols or branched chain alkylene glycols without significant deleterious effect on the properties of these interpolyesters. In fact, when the interpolyester is to be employed for purposes other than for making fibers, appreciable quantities of those added glycols can be employed with some advantageous results as long as an exceptionally high melting point is not desired.

Photographic film made from an interpolyester of this invention retains its original dimensions to a very high degree despite the effects of changes in the humidity of the atmosphere, the treatment of the film with developing solutions, etc. The improvement is surprisingly great in comparison to conventional film made with cellulose derivatives such as the various alkanoic esters or the nitrate; moreover, no plasticizer is needed in conjunction with these novel interpolyesters. Furthermore, no solvent need be employed in preparing sheets or film from these novel interpolyesters inasmuch as extrusion methods can be employed whereby substantial savings in the costs of solution methods and solvent recovery can be avoided.

Two of the outstanding qualities of the interpolyesters of this invention are their excellent dimensional stability and low degree of water absorptivity. This results in superior resistance to dimensional change despite changes in atmospheric humidity or immersion in aqueous solutions.

One embodiment of this invention relates to a process for preparing an interpolyester comprising (A) condensing from about 1 to about 10 mole proportions of an aromatic dibasic acid diester having the following formula:

$$R_1O-OC-Ar-CO-OR_2$$

wherein Ar represents a divalent radical selected from the group consisting of 1,4-disubstituted benzene, 1,2-di(p-substituted phenoxy)ethane, 1,2-di(p-substituted phenyl)ethane, p,p'-disubstituted biphenyl and 1,5-disubstituted naphthalene, and $R_1$ and $R_2$ each represent a radical derived from an alcohol selected from the group consisting of alkanols and polymethylene glycols containing up to 10 carbon atoms, plus one mole proportion of an omega-hydroxyalkyl diester of carbonic acid containing from 5 to 21 carbon atoms, (B) with a polymethylene glycol containing from 2 to 10 carbon atoms, the polymethylene glycol being employed in such a proportion that there is at least an equivalent amount of oxy substituents in proportion to the carboxy substituents in the overall combination of the diesters and the glycol, (C) in the presence of a catalytic condensing agent, e. g. a compound selected from the group consisting of the alkali metals, the alkaline earth metals, the oxides of these two groups of metals, the alkoxides containing from 1 to 6 carbon atoms of these two groups of metals, the carbonates and borates of these two groups of metals, lead oxide, and compounds having the following formulas:

$M(Al(OR)_4)$
$M(HZr(OR)_6)$, $M'(HZr(OR)_6)_2$
$MH(Ti(OR)_6)$, $M_2(Ti(OR)_6)$
$M'(HTi(OR)_6)_2$, $M'(Ti(OR)_6)$
$(RR'R''R''')N)_2(Ti(OR)_6)$
$(RR'R''R''')N)H(Ti(OR)_6)$
$Ti(OR)_4$, $PbR_4$ and
$RMgHal$, etc.

wherein M represents an alkali metal, M' represents an alkaline earth metal selected from the group consisting of magnesium, calcium and strontium, R represents an alkyl group containing from 1 to 6 carbon atoms, R', R'' and R''' each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

Advantageously, the polymethylene glycol is employed in such a proportion that there are from about 1.25 to about 2 oxy substituents in proportion to the carbalkoxy substituents in the overall combination of the diesters and the polymethylene glycol. Advantageously, the low pressure defined under (F) is less than about 15 mm. of Hg pressure. Advantageously, the elevated temperature employed during the earlier part of the condensation is from about 170° to about 200° C. Advantageously the temperature during the latter part of the reaction is from about 240° to about 300° C., depending upon the melting point of the polyester.

The polymethylene glycols mentioned above may not actually contain any free hydroxy radicals since they may be in esterified form. Whether or not it is esterified, it is considered that the polymethylene glycols contain 2 oxy substituents and no carboxy radicals which can enter into the polyesterification condensation. Similarly, the omega-hydroxyalkyl diesters of the aromatic acid or carbonic acid are each considered as containing 2 carboxy and 4 oxy substituents. Whenever the alcoholic portion of such esters is derived from a monohydric alcohol it is considered that the ester contains no oxy radicals and 2 carboxy radicals since the monohydric alcohols do not enter into the polyesterification reaction.

It is apparent that the process of this invention can be preceded by the formation of the aromatic dibasic acid diester by a preliminary step comprising condensing the free acid with a monohydric alcohol or more preferably with a glycol.

The polymethylene glycols which can be employed to form highly polymeric linear polyesters are straight-chain alkane diols wherein the hydroxy radicals are positioned at the two ends of the alkylene chain. Examples of such glycols include ethylene glycol, 1,3-propylene glycol, 1,4-butylene glycol, 1,6-hexylene glycol, 1,10-decamethylene glycol, etc. As indicated above, mono or diesters of these glycols can also be employed. Thus, the acetates, propionates and butyrates are examples of such esters. Mixtures of alkylene glycols or ether glycols can also be employed. Examples of ether glycols include diethylene glycol, triethylene glycol, tetraethylene glycol, bis(4-hydroxybutyl)ether, bis(3-hydroxypropyl) ether, etc. When mixtures of alkylene glycols and ether glycols are employed, a major proportion of the alkylene glycol is employed in order to obtain higher melting linear polyesters. The high melting characteristic also is dependent upon the amount of carbonic acid present in the interpolyester and the chain length of the alkylene glycol employed. Higher proportions of carbonic acid lower the melting and softening temperatures of the interpolyesters. The same effect is created by employing a longer chain (higher carbon content) alkylene glycol. For example, when an 8 to 10 carbon atom glycol is employed, practically no aliphatic ether glycol should be employed; whereas, when a 2–4 carbon atom glycol is employed the amount of ether glycol can be a fairly substantial proportion of the total quantity of glycols. In lieu of the ether glycols, the branched chain alkylene glycols can be similarly employed, e. g. 2-methylpentanediol, 3-methyl-hexanediol, etc.

Valuable fibers having high melting temperatures can be prepared by employing ethylene glycol and at least 3 mole proportions of the aromatic dibasic acid diester for each mole proportion of the carbonic acid ester.

The temperature at which polyesterification can be conducted is dependent upon the specific reactants involved in any given reaction. In general, the reaction mixture can be heated at from about 150°–170° C. to about 200–220° C. for from approximately two to three hours in an inert atmosphere (e. g. nitrogen or hydrogen); the mixture can then be heated at from about 225°–240° C. to about 280°–310° C. in the same atmosphere for approximately 1 to 2 hours. Finally, the pressure can be greatly reduced to form a vacuum (less than about 15 mm. of Hg pressure but preferably on the order less than 5 mm. of Hg pressure) while the temperature is maintained in the same range (about 240°–300°); these conditions are advantageously maintained for approximately 4 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended.

The catalytic condensing agents which can be employed have been described above. From about 0.005% to about 0.2% of such catalysts based on the weight of the reactants being condensed can be employed. Higher or lower percentages can also be employed. Generally, from about 0.01% to about 0.06% of the catalytic condensing agent can be advantageously employed based on the weight of the various diester being condensed.

It has been found that the type of catalyst used has a significant bearing upon the properties of the final product. Although most of the catalysts cited in the prior art may be used, it has been found that certain novel catalysts give superior results. The aluminum and titanium alkoxide complexes described in copending applications filed on October 3, 1952, are especially valuable for the preparation of the polyesters described here. Moreover, novel tin catalysts have also been found to be especially effective. See Caldwell Serial No. 313,072, Serial No. 313,078, Caldwell and Reynolds Serial No. 313,077, Wellman and Caldwell Serial No. 313,074, Serial No. 313,075 and Serial No. 313,076, and Wellman Serial No. 313,073 for a further description of these especially advantageous catalytic condensing agents. The titanium, tin, and aluminum compounds are preferred catalysts.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

It is important to exclude oxygen and moisture at all stages of the condensation reaction. Inert atmospheres which can be advantageous employed include nitrogen, hydrogen, helium, etc. Substantially anhydrous reactants can also be advantageously employed although this is not essential, especially if any water is removed in the earlier stages of the condensation.

As indicated above, the acidic constituents of the interpolyesters are employed in the form of their diesters. The omega-hydroxyalkyl diesters can be prepared as mentioned above by heating a polymethylene glycol with the free acid, preferably employing an excess of the glycol. The acid chlorides can be employed in some cases although the conditions involved are generally substantially different.

Examples of the various aromatic dibasic acid diesters which can be employed in accordance with the process of this invention include the ethyl, propyl, n-butyl, sec-butyl, isopropyl, sec-amyl, n-hexyl, 10-hydroxydecyl, 5-hydroxyamyl, 2-hydroxyethyl, etc. diesters of any of the named aromatic dibasic acids. It is not essential that these be symmetrical esters, for example the methyl ethyl diester can be employed of p,p'-diphenic acid or the pentyl hexyl diester of 1,5-naphthalene dicarboxylic acid can be employed. Other esters include the sec. butyl diester of 1,2-di(p-carboxyphenyl)ethane, the methyl diester of 1,2-di(p-carboxyphenoxy) ethane, the hydroxypentamethyleneoxy diester of terephthalic acid, etc.

The advantageous ratio of aromatic dibasic acid diester to the carbonic acid diester will depend upon the type of product desired. As the mole percent of the carbonic acid in the polyester is increased, the melting point of the product is lowered. When short chain glycols such as ethylene glycol and tetramethylene glycol are used, more of the carbonic acid ester can be employed without reducing the melting point of the product below about 150° C. When higher glycols such as pentamethylene, hexamethylene, and octamethylene glycol are used, up to about 10 mole proportions of the aromatic dibasic acid diester can be advantageously employed in order to keep a fairly high melting point.

In general, the polyesters can be conveniently prepared by first condensing in the presence of a catalyst an alkyl ester of carbonic acid with at least 2 moles of a glycol to form the omega-hydroxyalkyl diester of carbonic acid. The usual ester interchange catalysts can be advantageously employed, see also the catalysts listed above. To this condensate can then be added the ester of the dibasic aromatic acid followed by further condensation with more glycol. The omega-hydroxyalkyl diester of carbonic acid can also be advantageously prepared by condensing phosgene with an excess of a glycol.

The products of this invention are linear interpolyesters which possess favorable flow characteristics over a temperature differential or range of about 5° to 20° C. and which contain in the interpolyester configuration a ratio of from about 1 to about 10 of one of the following repeating units:

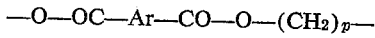

to each one of the following repeating units:

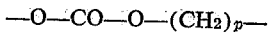

wherein Ar is the decarboxylated nucleus of an aromatic dibasic acid selected from the group consisting of terephthalic acid, 1,2-di(p-carboxyphenoxy)ethane, 1,2-di(p-carboxyphenyl)ethane, p,p'-diphenic acid and 1,5-dicarboxynaphthalene and $p$ represents a positive integer of from 2 to 10. Ar can also be defined as set forth hereinabove, i. e. as a divalent radical selected from the group consisting of 1,4-disubstituted benzene, 1,2-di(p-substituted phenoxy) ethane, 1,2-di(p-substituted phenyl) ethane, p,p'-disubstituted biphenyl and 1,5-disubstituted naphthalene.

In the first example given below, the hot bar sticking temperature is referred to. The hot bar sticking test can be briefly described as follows: A polyester fiber is placed on the flat surface of a heated bar and a weight of 100 grams is applied to the fiber along a distance of 5/8 inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed herein.

This invention can be further illustrated by the following examples; in addition to these examples it is apparent that other variations and modifications thereof can be adapted to obtain similar results:

*Example 1.—Dimethyl terephthalate, di(β-hydroxyethyl)carbonate, and ethylene glycol*

One hundred and eighteen grams (1.0 mole) of ethyl carbonate and 186 g. (3.0 moles) of ethylene glycol were placed in a distilling flask equipped with a distilling column. A solution of 0.2 g. sodium titanium ethoxide in 10 cc. ethanol was added as catalyst and the mixture was heated at 100–120° C. Ethyl alcohol distilled, and the temperature was gradually raised to 140–150° C. When 1.7–1.9 moles of alcohol had been removed, the product was cooled to room temperature. It consisted principally of di(β-hydroxyethyl) carbonate, along with some low molecular weight polyethylene carbonate. The preceding product was placed in a reaction vessel equipped with a short distillation column, a stirrer, and an inlet for purified hydrogen. Seven hundred and 76 g. (4.0 moles) of dimethyl terephthalate, and 500 g. (8.0 moles) of ethylene glycol were added to the vessel. A solution of 0.5 g. sodium titanium ethoxide in 25 cc. ethyl alcohol was added as a catalyst. The mixture was stirred at 19°–200° C. in an atmosphere of purified hydrogen. Methyl alcohol distilled rapidly and the ester interchange was practically complete in 3 hours. The temperature was then raised to 250° C. and held for 1 hour. A vacuum of 0.5 mm. was applied and stirring was continued for 3–4 hours. A high viscosity, colorless polyester was obtained.

The molar ratio of terephthalic acid to carbonic acid in the polyester is 4:1. The following properties show the relationship of this polymer to polyethylene terephthalate:

(a) The polymerization was carried out at a temperature of 250° C. Polyethylene terephthalate must be prepared at a temperature of 270–280° C. in order to prevent solidification. This shows that the melting point was depressed by the presence of carbonate radicals in the molecular chain.

(b) The product is soluble in trichlorethane at 100° C. Polyethylene terephthalate is not soluble under these conditions.

The product was spun into fibers by extruding the melt through a multi-hole spinneret. The fibers had a tensile strength of 3.2 grams per denier and elongation of 22%. They had excellent elastic recovery. They stuck to the hot bar at 215–220° C. The fibers could be dyed readily with cellulose acetate dyes.

*Example 2.—Dimethyl terephthalate, di(β-hydroxyethyl) carbonate and ethylene glycol*

The procedure described in Example 1 was repeated except that only half as much of the dimethyl terephthalate and ethylene glycol were employed. This produced a polyester in which the molar ratio of terephthalic acid to carbonic acid is 2:1. This interpolyester had a softening temperature in the range of 160°–170° C. It was soluble in trichlorethane at 40–50° C. Solutions in this solvent or in other suitable solvents can be employed to cast films or sheets. This polyester is especially valuable as a molding plastic because of its relatively wide softening range, it can be molded readily by injection or compression methods. This polyester can also be extruded in the form of rods, tubes, films, etc.

*Example 3.—Dimethyl terephthalate, di(gamma-hydroxypropyl) carbonate and trimethylene glycol*

One hundred and eighteen grams (1.0 mole) of ethyl carbonate and 228 g. (3.0 moles) of trimethylene glycol were heated in a vessel equipped with a distillation column. A solution of 0.4 g. lithium aluminum ethylate in 10 cc. ethyl alcohol was used as catalyst. The temperature was raised to 160° C. during a period of 4 hours. About 1.8 moles of ethyl alcohol distilled from the reaction mixture. This product, which was principally di(gamma-hydroxypropyl) carbonate, was employed as described in Example 1 to make a mixed polyester with terephthalic acid. The product had the composition 3.0 moles terephthalic acid+1.0 mole carbonic acid+4.0 moles trimethylene glycol. It softened over about a 10 degree range at around 150° C. This polyester is especially valuable as a molding plastic. Films can be cast from solutions in trichlorethane.

*Example 4.—Diethyl p,p'-diphenate, di(β-hydroxyethyl)carbonate and ethylene glycol*

This polyester was prepared by means of the procedure described in Examples 1 and 2 except that the diethyl ester of p,p'-diphenic acid was employed instead of dimethyl terephthalate. The interpolyester produced had the following composition: 2 mols of p,p'-diphenic acid+1 mol of carbonic acid plus 3 mols of ethylene glycol. This interpolyester softened at 160-170° C. It was useful for the same purposes as described in Example 2.

*Example 5.—1,5-dicarboxynaphthalene, di(delta-hydroxybutyl)carbonate and tetramethylene glycol*

This interpolyester was prepared as described in the preceding examples except that different reactants were employed. The di(delta-hydroxybutyl)carbonate was prepared as described in Example 1 except that tetramethylene glycol was employed instead of ethylene glycol. In carrying out the condensation reaction to produce the polyester two mols of the diethyl ester of 1,5-dicarboxynaphthalene and 1 mol of di(delta-hydroxybutyl)carbonate were reacted with 3.5 moles of tetramethylene glycol. The interpolyester produced had the following composition: 2 moles of 1,5-dicarboxynaphthalene+1 mole of carbonic acid+3 moles tetramethylene glycol. This product was suitable for the same purposes as described in Example 3.

*Example 6.—1,5-dicarboxynaphthalene, di(β-hydroxyethyl)carbonate and ethylene glycol*

The procedure described in Example 5 was repeated exactly except that ethylene glycol was employed instead of tetramethylene glycol. This interpolyester was useful for the same purposes as was the product of Example 5. It had a higher softening temperature range. This product was especially suitable for injection molding.

*Example 7.—1,2-di(p-carbethoxyphenoxy)ethane, di-(β-hydroxyethyl)carbonate and ethylene glycol*

This polyester was prepared according to the procedures set forth in the preceding examples so as to produce a product having the composition: 6 moles of 1,2-di(p-carboxyphenoxy)ethane+1 mole of carbonic acid+7 moles of ethylene glycol. This product was useful for the same purposes as described above.

*Example 8.—Dibutyl p,p'-diphenate, di(delta-hydroxybutyl)carbonate and tetramethylene glycol*

This product was prepared as described in the preceding examples whereby the interpolyester had the following composition: 1 mole of p,p-diphenolic acid+1 mole of carbonic acid+2 moles of tetramethylene glycol. This product resulted in the formation of clear tough films when cast from a solution in tertiary clorethane. This interpolyester had similar properties to those described above.

*Example 9.—1,2-di(p-carbmethoxyphenyl)ethane, di(β-hydroxyethyl)carbonate and ethylene glycol*

This product was prepared as described in the preceding examples so as to result in the composition of: 4 moles of 1,2-di(p-carboxyphenyl)ethane+1 mole of carbonic acid+5 moles of ethylene glycol. This interpolyester had essentially the same properties as those described above.

*Example 10.—1,2 - di(p - carboethoxyphenyl)ethane, di-(omega - hydroxyhexyl)carbonate and hexamethylene glycol*

A polyester was made in the manner described in Example 9 except that hexamethylene glycol was employed in lieu of ethylene glycol. This product had similar properties except for a lower softening temperature range.

*Example 11.—Dihexyl terephthalate, di(delta-hydroxybutyl)carbonate and tetramethylene glycol*

This product was prepared in the manner similar to that described in Example 1 except for the differences in the reactants. The polyester produced had essentially similar properties except for a lower softening temperature range.

What I claim is:

1. A process for preparing a linear polyester comprising (A) condensing from about 1 to about 10 mole proportions of an aromatic dibasic acid diester having the formula:

$$R_1O—OC—Ar—CO—OR_2$$

wherein $R_1$ and $R_2$ each represents a radical selected from the group consisting of an omega-hydroxyalkyl radical containing from 2 to 10 carbon atoms and an alkyl radical containing from 1 to 10 carbon atoms and Ar represents a divalent aromatic radical selected from the group consisting of 1,4-disubstituted benzene, 1,2-di-(p - substituted phenoxy)ethane, 1,2 - di(p - substituted phenyl)ethane, p,p'-disubstituted biphenyl and 1,5-disubstituted naphthalene, plus one mole proportion of an omega-hydroxyalkyl diester of carbonic acid containing from 5 to 21 carbon atoms, (B) with a polymethylene glycol containing from 2 to 10 carbon atoms, the glycol being employed in such a proportion that there is at least an equivalent amount of hydroxy substituents in proportion to the carboxy substituents in the overall combination of the diesters and the glycol, (C) in the presence of a catalytic condensing agent, (D) at an elevated temperature, (E) the condensation being conducted in an inert atmosphere, and (F) the latter part of the condensation being conducted at a very low pressure of the inert atmosphere.

2. A process as defined in claim 1 wherein the elevated temperature is increased gradually during the course of the condensation up to a temperature of from about 225° to about 310° C.

3. A process as defined in claim 2 wherein the condensing agent is employed in an amount of from about 0.005% to about 0.2% based on the weight of the diesters employed.

4. A process as defined in claim 3 wherein the glycol is employed in such a proportion that there are from about 1.25 to about 2 hydroxy substituents in proportion to the carboxy substituents in the overall combination of the diesters and the glycols.

5. A process as defined in claim 4 wherein the elevated temperature employed during the earlier part of the condensation is from about 150° to about 220° C. and the low pressure defined under (F) is less than about 5 mm. of Hg pressure.

6. A process as defined in claim 5 wherein all materials employed in the process are substantially anhydrous.

7. A process as defined in claim 6 wherein the aromatic acid diester is dimethyl terephthalate, the carbonic acid diester is the hydroxyethyl diester and the glycol is ethylene glycol.

8. A process as defined in claim 6 wherein the aromatic acid diester is dimethyl terephthalate, the carbonic acid diester is the hydroxypropyl diester and the glycol is trimethylene glycol.

9. A process as defined in claim 6 wherein the aromatic acid diester is diethyl p,p'-diphenate, the carbonic acid diester is the hydroxyethyl diester and the glycol is ethylene glycol.

10. A process as defined in claim 6 wherein the aromatic acid diester is 1,5-dicarbethoxy naphthalene, the carbonic acid diester is the hydroxyethyl diester and the glycol is ethylene glycol.

11. A process as defined in claim 6 wherein the aromatic acid 1,2-di(p-carbmethoxyphenyl)ethane, the carbonic acid diester is the hydroxyethyl diester and the glycol is ethylene glycol.

12. A process as defined in claim 1 wherein the aromatic acid diester is formed by a preliminary step comprising condensing an aromatic dibasic acid selected from the group consisting of terephthalic acid, 1,2-di(p-carboxyphenoxy)ethane, 1,2 - di(p - carboxyphenyl)ethane, p,p'-diphenic acid and 1,5-dicarboxynaphthalene with a polymethylene glycol containing from 2 to 10 carbon atoms at an elevated temperature, after which preliminary step the carbonic acid diester and the glycol are added and the condensation is completed as described in claim 1.

13. A process as defined in claim 12 wherein the condensing agent is employed in an amount of from about 0.005% to about 0.2% based on the weight of the diesters being condensed, the elevated temperature employed during the earlier part of the condensation to form the interpolyester is from about 150° C. to about 220° C. and the low pressure defined under (F) is less than about 5 mm. of Hg pressure.

14. A linear interpolyester having a softening temperature range of from about 5° to 20° C. containing in the interpolyester configuration a ratio of from about 1 to about 10 of one of the following repeating units:

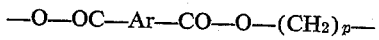

to each one of the following repeating units

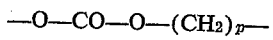

where Ar represents a divalent radical selected from the group consisting of 1,4-disubstituted benzene, 1,2-di(p-substituted phenoxy) ethane, 1,2-di(p-substituted phenyl) ethane, p,p'-disubstituted biphenyl and 1,5-disubstituted naphthalene, and $p$ represents a positive integer of from 2 to 10, which interpolyester consists essentially of only those repeating units whose formulas have been set forth in this claim and which interpolyester is capable of being readily formed into shaped objects within its softening range.

15. An interpolyester as defined in claim 14 wherein Ar represents 1,4-disubstituted benzene and $p$ represents 2.

16. An interpolyester as defined in claim 14 wherein Ar represents 1,4-disubstituted benzene and $p$ represents 3.

17. An interpolyester as defined in claim 14 wherein Ar represents p,p'-disubstituted bipenyl and $p$ represents 2.

18. An interpolyester as defined by claim 14 wherein Ar represents 1,5-disubstituted naphthalene and $p$ represents 2.

19. An interpolyester as defined by claim 14 wherein Ar represents 1,2-di(p-substituted phenyl) ethane and $p$ represents 2.

References Cited in the file of this patent

UNITED STATES PATENTS 2,210,817    Peterson _____ Aug. 6, 1940